US009410713B2

(12) United States Patent
Lau

(10) Patent No.: US 9,410,713 B2
(45) Date of Patent: Aug. 9, 2016

(54) HVAC FAN CONTROLLER

(71) Applicant: James Lau, Tustin, CA (US)

(72) Inventor: James Lau, Tustin, CA (US)

(*) Notice: Subject to any disclaimer, the term of this patent is extended or adjusted under 35 U.S.C. 154(b) by 523 days.

(21) Appl. No.: 14/016,012

(22) Filed: Aug. 30, 2013

(65) Prior Publication Data

US 2015/0060038 A1 Mar. 5, 2015

(51) Int. Cl.
*F24F 11/02* (2006.01)
*F24F 11/00* (2006.01)
*H02P 7/295* (2016.01)

(52) U.S. Cl.
CPC ............ *F24F 11/0079* (2013.01); *H02P 7/295* (2013.01); *Y02B 30/746* (2013.01)

(58) Field of Classification Search
None
See application file for complete search history.

(56) References Cited

U.S. PATENT DOCUMENTS 5,592,989 A * 1/1997 Lynn .................. G05D 23/1902
165/259
5,650,697 A * 7/1997 Imagi .................. F24F 11/0001
318/400.2

* cited by examiner

*Primary Examiner* — Sean Shechtman
(74) *Attorney, Agent, or Firm* — CIONCA Law Group P.C.; Marin Cionca

(57) ABSTRACT

An integrated efficient fan controller circuit device for controlling a fan of a heating, ventilating and air conditioning (HVAC) system, comprising an input-output port, a voltage regulator, a microprocessor, and a transistor wherein the transistor turns on the microprocessor that sends a trigger signal to the gate of a triac which controls the fan of an HVAC system to switch OFF the HVAC fan operation when the thermostat fan output is in float or unknown state. The proposed circuit avoids the floating state of the thermostat fan output and keeps the HVAC fan either in ON state or in OFF state. The transistor acts as a switch and the collector of the transistor is connected to the input terminal of microprocessor which controls the triac operation. The microprocessor measures the real time temperature of the system and controls the operation of the HVAC fan. The present invention handles the switching OFF of the HVAC fan operation when the thermostat fan is switched to OFF.

19 Claims, 3 Drawing Sheets

HVAC FAN CONTROLLER

BACKGROUND OF THE DISCLOSURE

1. Technical Field of the Disclosure

This embodiment relates in general to an efficient fan controller (EFC) for extending the fan run time of a HVAC systems after the heating or cooling unit has shut off. More specifically, the present embodiment is a new circuitry for changing the unknown state of the thermostat fan controller circuitry into a known state after the thermostat is turned off.

2. Description of the Related Art

Conventional HVAC (Heating Ventilating and Air Conditioning) systems include temperature changing components for changing the temperature and condition of air. Indoor air handlers drive air from the temperature changing component through supply ducts to zones within a building. A typical HVAC consists of heating unit, air conditioning unit and the fan or blower at the air handler unit. A thermostat is used to control the conditions of the air in a conditioned space by sending control signals to the HVAC furnace controller or HVAC air conditioning controller or HVAC fan controller to activate or deactivate one or more components.

Conventional HVAC fan controller typically operates the ventilation fan for 0 second to 90 seconds after the furnace or air conditional compressor has been turned off. Studies has shown that even after this 90 seconds duration, the furnace surface and the air conditioner cooling coil still has some energy left. This wasted energy is not delivered to the conditioned space when the fan stops blowing. Therefore there is a need in a HVAC system with a secondary fan controller device that can be used to recover additional heating and cooling capacity and operate HVAC equipment at higher efficiency.

The EFC will adjust the fan operation automatically for heating based on gas valve activation time or furnace operating time or Heat Pump activation time. For air conditioning, the same EFC will adjust fan operation automatically for cooling based on air-conditioning compressor run time. The amount of time the fan continues to operate after the furnace is off or after the air conditional compressor is off, varies with the amount of time the furnace or compressor are on using a microprocessor and firmware. The furnace additional fan run time indicates how much left over heat is stored in the heat exchanger. The air conditioner compressor additional run time indicates how much cold water is condensed on the evaporator coil. Hence, the EFC recovers and delivers more heating and cooling energy to the conditioned space than is possible with original HVAC fan controllers. The EFC improves the efficiency of HVAC equipment by delivering additional heating or cooling capacity for a small amount of additional electric energy (kWh).

Air conditioners cool conditioned spaces by removing sensible and latent heat from the return air which reduces the supply air temperature and humidity. Latent heat is removed as water vapor is condensed out of the air due to the temperature of the evaporator coil being less than the return air dew point temperature. Latent heat is the quantity of heat absorbed or released by air undergoing a change of state, such as water vapor condensing out of the air as water onto a cold evaporator coil or cold water evaporating to water vapor which will cool the air. Most evaporators are cold and wet (below 40 to 50° F.) after the compressor turns off. Cooling energy left on the evaporator coil after the compressor turns off is generally wasted. The evaporator absorbs heat from the attic and cold water on the coil flows down the condensate drain. The EFC recovers the remaining cooling energy from evaporator coil by operating the fan after the compressor turns off to cool the conditioned space.

Most furnace heat exchangers are still hot (above 135 to 210° F.) after the furnace fan turns off. The EFC recovers the remaining heat energy from the hot furnace heat exchanger after the furnace turns off and delivers this heat to the conditioned space. The EFC works by hijacking the fan control signals emitted by the thermostat and replace it with the new fan control signal emitted by the EFC itself. In this way, the HVAC fan controller only receives the fan control signals from the EFC itself and not from the thermostat directly. When the thermostat sends out the fan activate or deactivate command signal, it goes only to the EFC. The EFC reads this command and commands from the other environmental conditions plus from the HVAC components and computes the additional fan run time. Then, the EFC sends the adjusted command signal to the HVAC fan controller requesting it to run for a programmed additional extended time. Therefore, the EFC depends on the fan command signal emitted by the thermostat as source of input. The command signal of a thermostat is either a high of 24 vac or 0 vac (ground). Correspondingly, the EFC accepts either 24 vac or 0 Vac as its inputs.

For the EFC to work universally, it has to interface with every manufacturers of thermostats used in HVAC system. There are many manufacturers of thermostats where the fan output command signal goes into a floating or unknown state when the thermostat is shut off by putting the thermostat switch to system off. In such a case, if an EFC is connected to the thermostat, the fan command signal being in to unknown state could be read in as ON state, and the EFC will turn the fan on and run continuously. Therefore, there is a need to have a circuit in the EFC circuitry to read any unknown or floating signals from the thermostat fan command signal as known 24 vac or 0 vac state. In this way, the fan will always be turned off when it is not at an ON state.

Further, there is a need for a HVAC system that would extend the fan run time and still shut the fan off when the thermostat fan output command signal is in a floating state. As such, it would be desirable to provide a simplified and lower cost EFC controller interface for an HVAC controller that could be easily operated by the user. Also such a needed system would solve the floating state of the thermostat fan output signal after the thermostat is turned off and keeps the HVAC fan in an OFF state.

SUMMARY OF THE INVENTION

To minimize the limitations found in the prior art, and to minimize other limitations that will be apparent upon the reading of the specifications, preferred embodiment of the present invention provides an integrated EFC circuit device for energy efficient operation of the HVAC blower or fan. The integrated EFC circuit device comprises an input-output port having a plurality of input terminals and an output terminal for connecting the integrated circuit device with the thermostat and the HVAC. The plurality of input terminals includes a first input terminal, a second input terminal, a third input terminal, a fourth input terminal and a fifth input terminal and a sixth output terminal. The first input terminal is connected to the fan output line terminal of the thermostat which is usually color coded as green wire and the second input terminal of the integrated circuit device is connected to the common terminal of the thermostat or directly to the common terminal of the HVAC controller board. There is no industry standard color coding for common wire. The third input terminal is connected to the ground terminal of the thermostat which is usually color coded as red wire. The fourth input terminal is connected to the air conditioner terminal of the thermostat which is usually color coded as yellow wire and the fifth input terminal is connected to the heater terminal of the thermostat which is usually color coded as white wire. The output terminal of the integrated EFC circuit device is connected to the fan or blower terminal of the HVAC system. A microprocessor and its embedded firmware act as a controller in the EFC device and include a plurality of terminals for sending and receiving signals. The microprocessor inside the EFC device having the plurality of terminals includes an air conditioner terminal, a heater terminal, a transistor terminal, a fan terminal, a common terminal and a ground terminal.

The air conditioner terminal of the EFC device is connected to the air conditioner and the heater terminal of the EFC device is connected to the heater of the thermostat. The fan terminal of the EFC device is connected to the fan controller of the HVAC system. A transistor is connected between an input of the microprocessor and input terminals of the EFC device. The voltage regulator provides a constant voltage to the transistor and the microprocessor to turn on a triac that enables energy efficient operation of the HVAC fan. The present invention with the switching transistor handles the thermostat fan output being in unknown or float problem by switching OFF the HVAC fan operation when the thermostat is switched to OFF when the thermostat Fan output goes into an unknown or floating state. The HVAC fan will stop during the period when the state of the thermostat is switched OFF.

One objective of the invention is to provide an integrated EFC circuit that handles the problem of switching OFF the HVAC fan when the thermostat is switched to OFF with the EFC connected to the HVAC system.

A second objective of the invention is to provide an integrated EFC circuit that can address the floating state of the thermostat fan command signal when working in conjunction with efficient fan controller associated with the HVAC system.

A third objective of the invention is to provide an circuit that avoids the floating state of the thermostat fan circuitry and keeps the HVAC fan either in ON state or in OFF state.

Another objective of the present invention is to provide a circuit for a fan controller of an HVAC system that can prevent the overheating or overcooling of spaces.

Yet another objective of the present invention is to provide a system that can measure the real time temperature of a space and controls the operation of the cooling fan.

Still another objective of the present invention is to provide a circuitry that stops the fan when the fan function of the thermostat is switched off.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof; and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
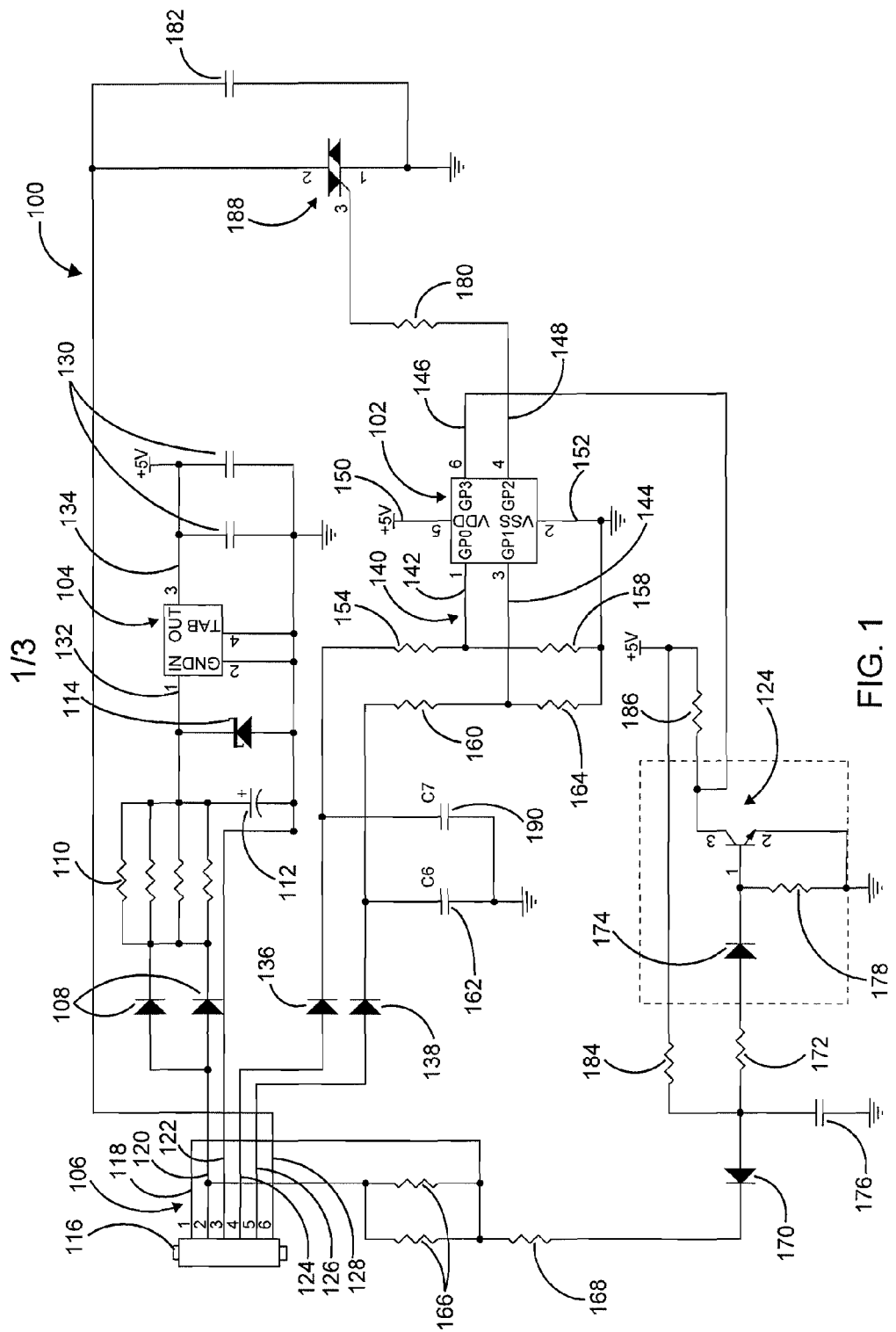
FIG. 1 illustrates a schematic circuit diagram of an integrated circuit device for controlling a fan of a heating, ventilating and air conditioning (HVAC) system.

FIG. 1 illustrates a schematic circuit diagram of an integrated EFC circuit 100 for controlling a fan of a heating, ventilating and air conditioning (HVAC) system. The integrated circuit 100 comprises an input-output port 116 having a plurality of input terminals 106 and an output terminal 128, a voltage regulator 104, a microprocessor 102, a transistor 124 and a triac 188, whereby at least one of the plurality of input terminals 106 switches the transistor 124 to a conducting state that turns on the microprocessor 102 which creates a trigger signal to turn on the triac 188, which provides an output to the circuit 100 that enables switching OFF the HVAC fan operation when the thermostat is switched OFF. The plurality of input terminals 106 and an output terminal 128 connects the integrated circuit 100 with the thermostat and the fan of an HVAC system. The plurality of input terminals 106 includes a first input terminal 118, a second input terminal 120, a third input terminal 122, a fourth input terminal 124 and a fifth input terminal 126. The first input terminal 118 has a voltage selected from a group consisting of: 24 Vac, 0 Vac and a floating value. The second input terminal 120 has a common terminal voltage of 24 Vac. The voltage regulator 104 acts as a constant voltage source to provide a constant voltage to the microprocessor 102 and the transistor 124. The voltage regulator 104 includes a pair of first input terminals 132 and a pair of first output terminals 134, the pair of first input terminals 132 is connected to the second input terminal 120 and the third input terminal 122 by a parallel pair of first diodes 108 and a plurality of parallel first resistors 110 in series followed by an input capacitor 112 and a zener diode 114 in parallel connected across the second input terminal 120 and the third input terminal 122. The zener diode 114 provides a constant voltage to the voltage regulator 104. The zener diode 114 is connected in parallel with a variable voltage source and act as voltage regulators to regulate the voltage across the voltage regulator 104. The zener diode 114 clamps the voltage to 24V across the input terminal of the voltage regulator 104. The integrated circuit 100 has a parallel pair of output capacitors 130 that are connected across the pair of first output terminals 134 of the voltage regulator 104. The microprocessor 102 has a plurality of terminals 140 to provide a triggering signal to the gate of the triac 188 and functions as a replacement thermostat fan output signal. The triac 188 is connected to the output terminal 128 of the integrated circuit 100 for controlling the fan function of the HVAC system. The plurality of terminals 140 of the microprocessor 102 includes an air conditioner terminal 142, a heater terminal 144, a transistor terminal 146, a fan terminal 148, a common terminal 150 and a ground terminal 152. The air conditioner terminal 142 is connected to the fourth input terminal 124 by a third diode 136 and a third resistor 154 in series and a third capacitor 156 and a fourth resistor 158 across the air conditioner terminal 142 and the ground terminal 152. The heater terminal 144 is connected to the fifth input terminal 126 by a fourth diode 138 and a first resistor 160 in series and a fourth capacitor 162 and a second resistor 164 across the heater terminal 144 and the ground terminal 152. The fan terminal 148 of the microprocessor 102 is connected to the output terminal 128 by means of a parallel combination of the triac 188 and a sixth capacitor 182, in series with an eighth resistor 180. The microprocessor 102 provides the gate signal for the triac 188 that control the fan of the HVAC system. The transistor 124 is an npn transistor that acts as a switching element and connected to the microprocessor 102 to manipulate the output signal. The base of the transistor 124 is connected to the second input terminal 120 and the first input terminal 118, by a pair of parallel second resistors 166 in series with a fifth resistor 168, a fifth diode 170, a sixth resistor 172 and a sixth diode 174. The base of the transistor has a fifth capacitor 176 and a seventh resistor 178 connected across and the ground terminal of the transistor 124. The collector of the transistor 124 is connected to the transistor terminal 146 of the microprocessor 102. The collector of the transistor 124 provides the input signal to the microprocessor 102 that controls the fan of the HVAC system. The integrated circuit 100 has the parallel pair of first diodes 108, the third diode 136, the fourth diode 158 and the sixth diode 174 in forward biased condition. The fifth diode 170 of the circuit 100 is reverse biased. The circuit 100 enables switching OFF the HVAC fan operation when the thermostat is switched OFF when the thermostat fan output is in float or unknown state. The circuit 100 process the float state of the thermostat fan output signal as it enters into circuit device 100 and outputs an OFF state signal in 128 to avoid the floating state of the thermostat fan output to falsely trigger the HVAC fan to turn on. The microprocessor 102 is programmed for energy efficient operation of the fan of the HVAC system by extending the fan run time of the HVAC blower fan based on the energy left over in the heater elements or in the air conditioning cooling coil after the thermostat send a command signal to have the HVAC fan shut off. The present invention with the switching transistor 124 handles the problem by switching OFF the HVAC fan operation when the thermostat is switched to OFF. The cooling fan will stop during the period when the fan function of the thermostat is switched OFF.

The first input terminal 118 voltage changes depending on ON/OFF position of the fan of the thermostat. The first input terminal 118 is coming from the thermostat fan output command signal (color coded green wire) and has a voltage selected from a group consisting of: 24 Vac, 0 Vac and a floating value. The floating value means that the first input terminal 118 is not connected to either 24 Vac or 0 Vac, and can assume any value. The second input terminal 120 always has a common terminal voltage of 24 Vac.

When the air conditioner is running, the heater must be in OFF position. When the air conditioner is ON, the air conditioner terminal 142 of the microprocessor 102 is low, and as the heater is OFF the heater terminal 144 must be high. When the first input terminal 118 and the second input terminal 120 has 24 Vac, the fifth diode 170 allows negative portion of the 24 Vac from the first input terminal 118 and the second input terminal 120 to be present at the anode of the fifth diode 170. The anode voltage of the fifth diode 170 is negative as illustrated by a CRO output as shown in FIG. 3A. The negative voltage charges the fifth capacitor 176 and causes the transistor 124 to be in off position. So the input to the terminal 146 of the microprocessor 102 is 5 Vdc/high. This causes the fan terminal 148 of the microprocessor 102 to be low and keeps the fan in OFF position.

When the first input terminal 118 has 0 Vac and the second input terminal 120 has 24 Vac, the 24 Vac of the second input terminal 120 sinks to the ground through the pair of parallel second resistors 166. The anode of the fifth diode 170 is now high from the 5 Vdc through a resistor 184 as illustrated by the CRO output as in FIG. 3B. The positive voltage causes the forward biased sixth diode 174 to conduct and turns ON the transistor 124. When the transistor 124 conducts, the transistor terminal 146 of the microprocessor 102 is 0 Vdc/low. The fan terminal 148 of the microprocessor 102 becomes high which turns on the triac 188 and keeps the fan in ON position.

When the first input terminal 118 is in floating state, the first input terminal 118 is not connected to 24 Vac or 0 Vac. In the floating state the voltage at input terminal 118 is unknown. The second input terminal 120 has 24 Vac flowing through the pair of parallel second resistors 166. The fifth diode 170 allows negative portion of the second input terminal 120 to be present at the anode of the fifth diode 170. The negative voltage charges the fifth capacitor 176 and causes the transistor 124 to be in off position. So the transistor terminal 146 of the microprocessor 102 is 5 Vdc and cause microprocessor 102 to provide a low signal on 148. This causes the fan terminal 148 of the microprocessor 102 to be low and keeps the fan in OFF position as well thereby solving the problem of the floating input into 118 from the thermostat fan output.

Figure 2:
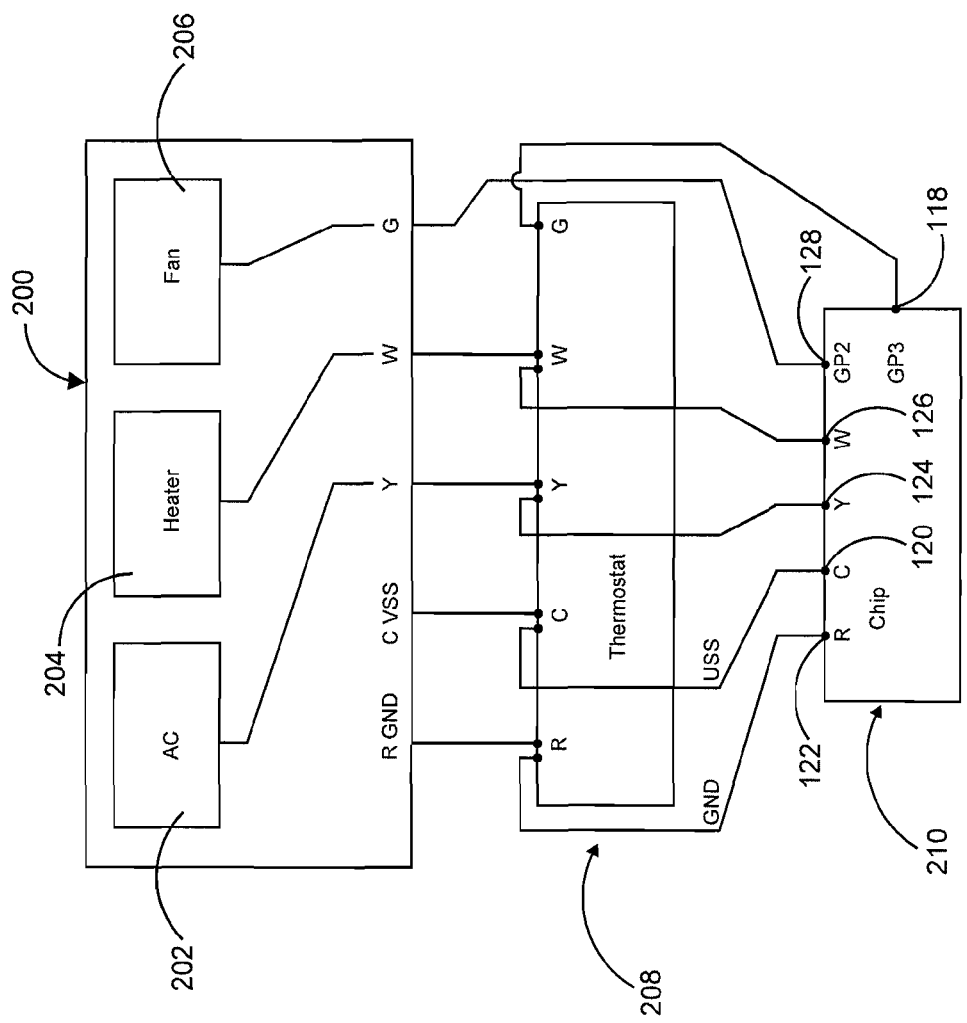
FIG. 2 illustrates a block diagram of the integrated circuit device for controlling a fan connected to the thermostat and the HVAC system.

FIG. 2 illustrates a block diagram of the integrated circuit 210 for controlling a fan 206 of an HVAC system 200. The HVAC system 200 includes an air conditioner 202, a heater 204 and a fan 206. A thermostat 208 is connected to the HVAC system 200 and to the integrated circuit 210. The air conditioner 202 is connected to the fourth input terminal 124 of the integrated circuit 210 through the Y terminal of the thermostat 208. First the air conditioner 202 is connected to the Y terminal of the thermostat 208 and then from the Y terminal of the thermostat 208 a connection is established to the fourth input terminal 124 of the integrated circuit 210. The heater 204 is connected to the fifth input terminal 126 of the integrated circuit 210 through the W terminal of the thermostat 208. The G terminal of the thermostat 208 is connected to the first input terminal 118 of the integrated circuit 210 and the output terminal 128 of the integrated circuit 210 is connected to the fan 206 of the HVAC system 200. The second input terminal 120 and the third input terminal 122 of the integrated circuit 210 is connected to the VSS terminal and the GND terminal respectively of the thermostat 208 and the HVAC system 200. When the air conditioner 202 of the HVAC system 200 is ON then the fan 206 must be ON and when the heater 204 of the HVAC system 200 is ON then also the fan 206 must be ON. The thermostat 208 senses the temperature and sends the corresponding command signal to the integrated circuit 210 that controls the functioning of the fan 206 of the HVAC system 200.

Figure 3B:
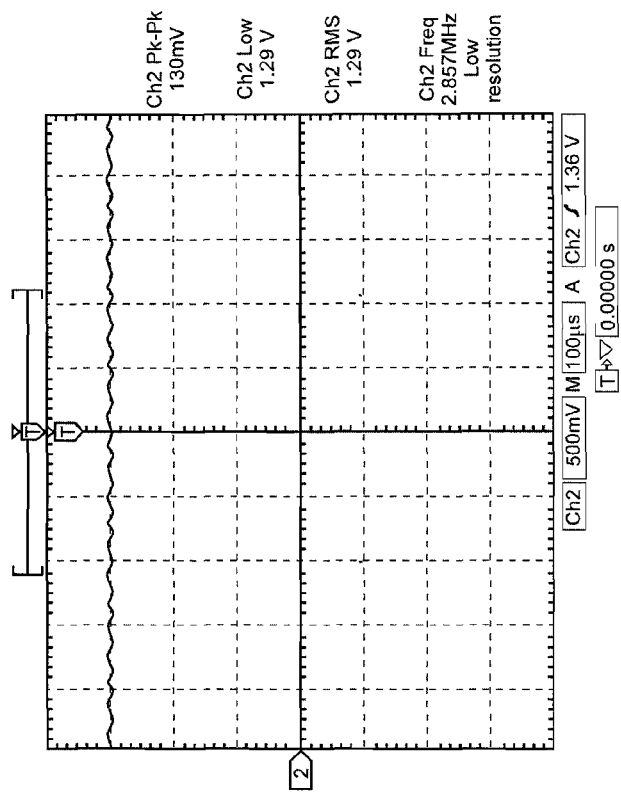
FIG. 3A-3B illustrates the cathode ray oscilloscope (CRO) output at the anode of the reverse biased fifth diode when the fan is at ON and OFF state.
Figure 3A:
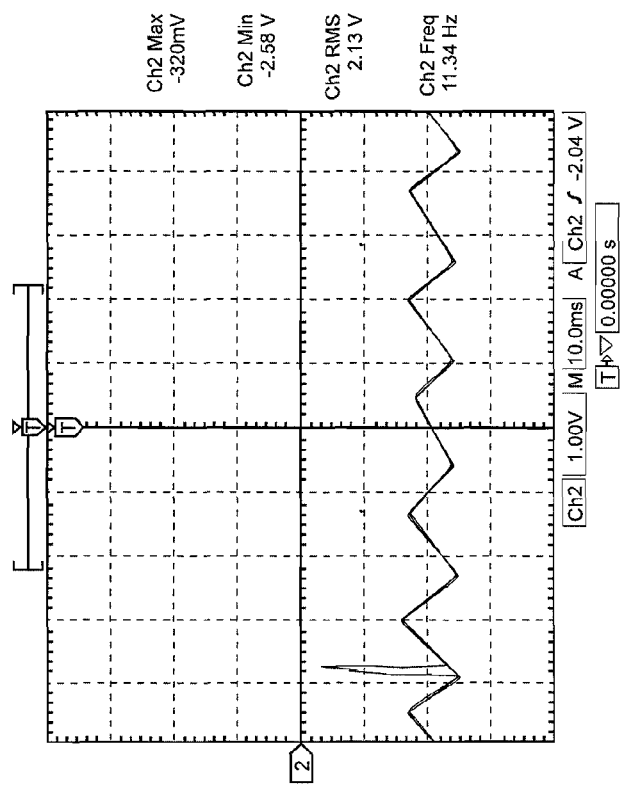

FIGS. 3A-3B illustrates the cathode ray oscilloscope (CRO) output at the anode of the reverse biased sixth diode 174 when the fan 206 of the HVAC system 200 is at ON and OFF state. When the first input terminal 118 and the second input terminal 120 has 24 Vac, the fifth diode 170 allows negative portion of the 24 Vac from the first input terminal 118 and the second input terminal 120 to be present at the anode of the fifth diode 170. The anode voltage of the fifth diode 170 is negative as illustrated by a CRO output as shown in FIG. 3A. The transistor 124 is in off position keeping the HVAC fan in OFF position. When the first input terminal 118 has 0 Vac and the second input terminal 120 has 24 Vac, the 24 Vac of the second input terminal 120 sinks to the ground through the pair of parallel second resistors 166. The anode of the fifth diode 170 is now high from the 5 Vdc through the resistor 184 as illustrated by the CRO output as in FIG. 3B. The positive voltage turns ON the transistor 124 that keeps the fan in ON position. When the first input terminal 118 has float or unknown state, the second input terminal 120 has 24 Vac, the fifth diode 170 allows negative portion of the 24 Vac from the first input terminal 118 and the second input terminal 120 to be present at the anode of the fifth diode 170. The anode voltage of the fifth diode 170 is negative as illustrated by a CRO output as shown in FIG. 3A. The transistor 124 is in off position keeping the HVAC fan in OFF position.

What is claimed is:

1. An integrated efficient fan controller (EFC) circuit device for controlling a fan of a heating, ventilating and air conditioning (HVAC) system, comprising:
   an input-output port having a plurality of input terminals and an output terminal for connecting the integrated circuit device with a thermostat and an HVAC system;
   a triac connected to the output terminal of the integrated circuit for controlling the fan function of the HVAC system;
   a microprocessor having a plurality of terminals for providing a triggering signal to the gate of the triac;
   a transistor that acts as a switching element and connects to the microprocessor to turn on/off the microprocessor; and
   a voltage regulator that acts as a constant voltage source to provide a constant voltage to the microprocessor and the transistor;
   whereby at least one of the plurality of input terminals switches the transistor to a conducting state that turns on the microprocessor which creates a trigger signal to turn on the triac, the triac providing an output to the circuit device that enables switching OFF the HVAC fan operation when the thermostat is switched OFF, and wherein the circuit device processes a floating state of a thermostat fan output as it enters the input terminals by outputting an OFF state signal in the output terminal to avoid the floating state of the thermostat fan output to falsely trigger the HVAC fan to turn ON.

2. The integrated EFC circuit device for controlling an HVAC fan of claim 1 wherein the plurality of input terminals includes a first input terminal, a second input terminal, a third input terminal, a fourth input terminal and a fifth input terminal.

3. The integrated EFC circuit device for controlling an HVAC fan of claim 1 wherein the microprocessor having a plurality of terminals includes an air conditioner terminal, a heater terminal, a transistor terminal, a fan terminal, a common terminal and a ground terminal.

4. The integrated EFC circuit device for controlling an HVAC fan of claim 3 wherein the air conditioner terminal is connected to a fourth input terminal by a third diode and a third resistor in series and a third capacitor and a fourth resistor across the air conditioner terminal and the ground terminal.

5. The integrated EFC circuit device for controlling an HVAC fan of claim 3 wherein the heater terminal is connected to a fifth input terminal by a fourth diode and a first resistor in series and a fourth capacitor and a second resistor across the heater terminal and the ground terminal.

6. The integrated EFC circuit device for controlling an HVAC fan of claim 1 wherein the voltage regulator includes a pair of first input terminals and a pair of first output terminals, the pair of first input terminals being connected to a second input terminal and a third input terminal by a parallel pair of first diodes and a plurality of parallel first resistors in series followed by an input capacitor and a zener diode in parallel connected across the second input terminal and the third input terminal.

7. The integrated EFC circuit device for controlling an HVAC fan of claim 1 wherein a parallel pair of output capacitors are connected across a pair of first output terminals of the voltage regulator.

8. The integrated EFC circuit device for controlling an HVAC fan of claim 1 wherein the base of the transistor is connected to a second input terminal and a first input terminal by a pair of parallel second resistors in series with a fifth resistor, a fifth diode, a sixth resistor and a sixth diode, a fifth capacitor and a seventh resistor connected across the base of the transistor and the ground terminal.

9. The integrated EFC circuit device for controlling an HVAC fan of claim 1 wherein a collector of the transistor is connected to a transistor terminal of the microprocessor.

10. The integrated EFC circuit device for controlling an HVAC fan of claim 1 wherein a fan terminal of the microprocessor is connected to the output terminal by means of a parallel combination of the triac and a sixth capacitor, in series with an eighth resistor.

11. The integrated EFC circuit device for controlling an HVAC fan of claim 1 wherein a first input terminal has a voltage selected from a group consisting of: 24 Vac, 0 Vac and a floating value.

12. The integrated EFC circuit device for controlling an HVAC fan of claim 1 wherein a second input terminal has a common terminal voltage of 24 Vac.

13. The integrated EFC circuit device for controlling an HVAC fan of claim 1 wherein a parallel pair of first diodes, a third diode, a fourth diode and a sixth diode are forward biased.

14. The integrated EFC circuit device for controlling an HVAC fan of claim 1 wherein the fifth diode is reverse biased.

15. The integrated EFC circuit device for controlling an HVAC fan of claim 1 wherein a zener diode provides a constant voltage to the voltage regulator.

16. The integrated EFC circuit device for controlling an HVAC fan of claim 1 wherein the transistor is an NPN transistor that acts as a switching circuit.

17. The integrated EFC circuit device for controlling an HVAC fan of claim 1 wherein a collector of the transistor provides the input signal to the microprocessor that controls the fan of the HVAC system.

18. The integrated EFC circuit device for controlling an HVAC fan of claim 1 wherein the microprocessor provides the gate signal for the triac that controls the fan of the HVAC system.

19. The integrated EFC circuit device for controlling an HVAC fan of claim 1 wherein the microprocessor is programmed for energy efficient operation of the HVAC fan.

* * * * *

UNITED STATES PATENT AND TRADEMARK OFFICE
CERTIFICATE OF CORRECTION

| | | |
|---|---|---|
| PATENT NO. | : 9,410,713 C1 | Page 1 of 1 |
| APPLICATION NO. | : 90/013991 | |
| DATED | : May 15, 2018 | |
| INVENTOR(S) | : James Lau | |

It is certified that error appears in the above-identified patent and that said Letters Patent is hereby corrected as shown below:

On the Title Page

Below Item (72), remove (73) assignee's name "LH Thermostate Systems, LLC, Longwood, FL (US)"

Signed and Sealed this
Thirteenth Day of August, 2019

Andrei Iancu
*Director of the United States Patent and Trademark Office*

(12) EX PARTE REEXAMINATION CERTIFICATE (11310th)
United States Patent
Lau

(10) Number: US 9,410,713 C1
(45) Certificate Issued: May 15, 2018

(54) HVAC FAN CONTROLLER

(71) Applicant: James Lau, Tustin, CA (US)

(72) Inventor: James Lau, Tustin, CA (US)

(73) Assignee: LH THERMOSTAT SYSTEMS, LLC, Longwood, FL (US)

Reexamination Request:
No. 90/013,991, Jul. 19, 2017

Reexamination Certificate for:
Patent No.: 9,410,713
Issued: Aug. 9, 2016
Appl. No.: 14/016,012
Filed: Aug. 30, 2013

(51) Int. Cl.
*F24F 11/02* (2006.01)
*F24F 11/00* (2018.01)
*H02P 7/295* (2016.01)

(52) U.S. Cl.
CPC .......... *F24F 11/0079* (2013.01); *F24F 11/77* (2018.01); *H02P 7/295* (2013.01); *Y02B 30/746* (2013.01)

(58) Field of Classification Search
None
See application file for complete search history.

(56) References Cited

To view the complete listing of prior art documents cited during the proceeding for Reexamination Control Number 90/013,991, please refer to the USPTO's public Patent Application Information Retrieval (PAIR) system under the Display References tab.

*Primary Examiner* — Christopher E. Lee

(57) ABSTRACT

An integrated efficient fan controller circuit device for controlling a fan of a heating, ventilating and air conditioning (HVAC) system, comprising an input-output port, a voltage regulator, a microprocessor, and a transistor wherein the transistor turns on the microprocessor that sends a trigger signal to the gate of a triac which controls the fan of an HVAC system to switch OFF the HVAC fan operation when the thermostat fan output is in float or unknown state. The proposed circuit avoids the floating state of the thermostat fan output and keeps the HVAC fan either in ON state or in OFF state. The transistor acts as a switch and the collector of the transistor is connected to the input terminal of microprocessor which controls the triac operation. The microprocessor measures the real time temperature of the system and controls the operation of the HVAC fan. The present invention handles the switching OFF of the HVAC fan operation when the thermostat fan is switched to OFF.

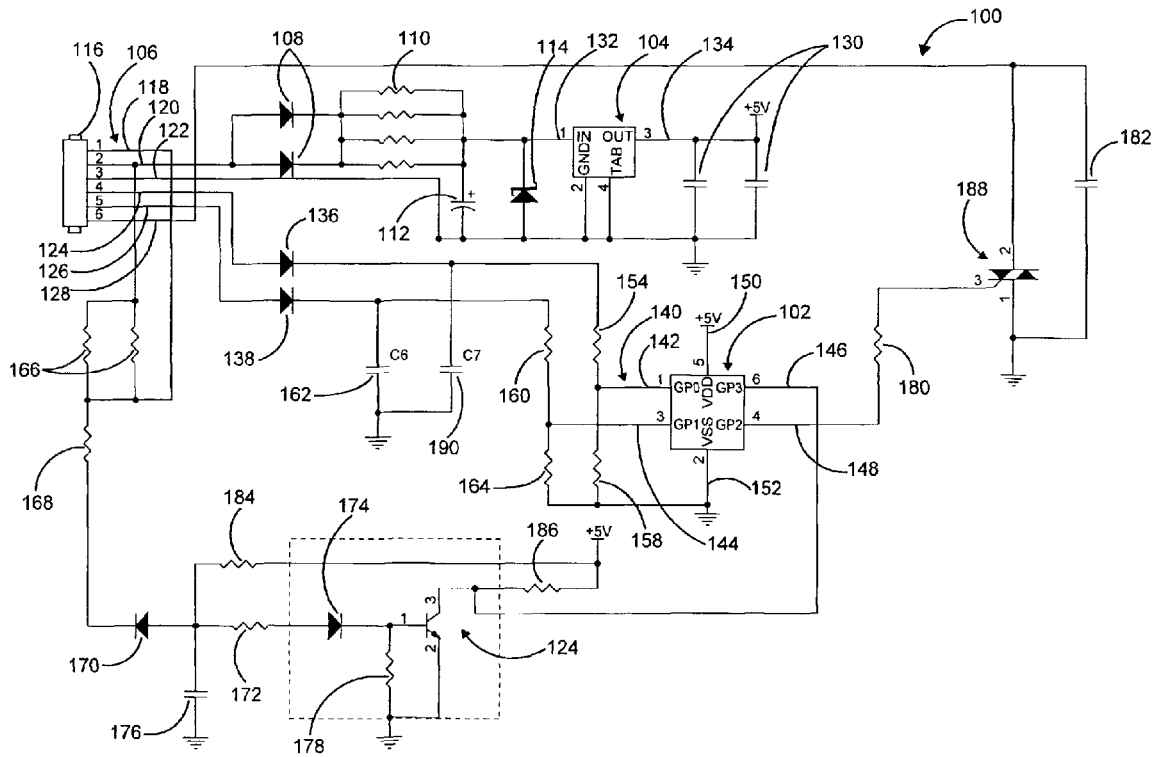

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-19 is confirmed.

\* \* \* \* \*